United States Patent [19]

Purcell et al.

[11] Patent Number: 5,433,515

[45] Date of Patent: Jul. 18, 1995

[54] GUIDE ROLLERS FOR FLEXIBLE DRIVE BELT

[75] Inventors: Robert J. Purcell, Washington; Ronald L. Satzler, Princeville, both of Ill.

[73] Assignee: Caterpillar Inc., Peoria, Ill.

[21] Appl. No.: 181,726

[22] Filed: Jan. 18, 1994

[51] Int. Cl.6 .............................................. B62D 55/14
[52] U.S. Cl. ........................................ 305/25; 305/56
[58] Field of Search .................... 305/11, 12, 13, 16, 305/25, 56, 21

[56] References Cited

U.S. PATENT DOCUMENTS

| | | | |
|---|---|---|---|
| 1,885,486 | 11/1932 | Smyth | 305/25 X |
| 2,059,213 | 11/1936 | Dorst | 305/21 |
| 2,363,015 | 11/1944 | Norelius | 305/10 |
| 3,155,436 | 11/1964 | Bonmartini | 305/13 |
| 3,929,385 | 12/1975 | Turkiewicz et al. | 305/56 |
| 4,059,314 | 11/1977 | Amstutz | 305/56 X |
| 4,283,094 | 8/1981 | Bertelsen | 305/16 |
| 4,502,736 | 3/1985 | Johnson | 305/9 |
| 5,104,205 | 4/1992 | Motomura et al. | 305/12 |

Primary Examiner—Russell D. Stormer
Attorney, Agent, or Firm—Claude F. White

[57] ABSTRACT

A pair of guide rollers contact the side surfaces of the guide blocks of an endless elastomeric track belt and guide the guide blocks into a space formed between a pair of spaced apart idler wheels. The guide rollers prevent undesirable frictional contact between the guide blocks and the idler wheels, thereby increasing the useful life of the idler wheels and the guide blocks.

14 Claims, 2 Drawing Sheets

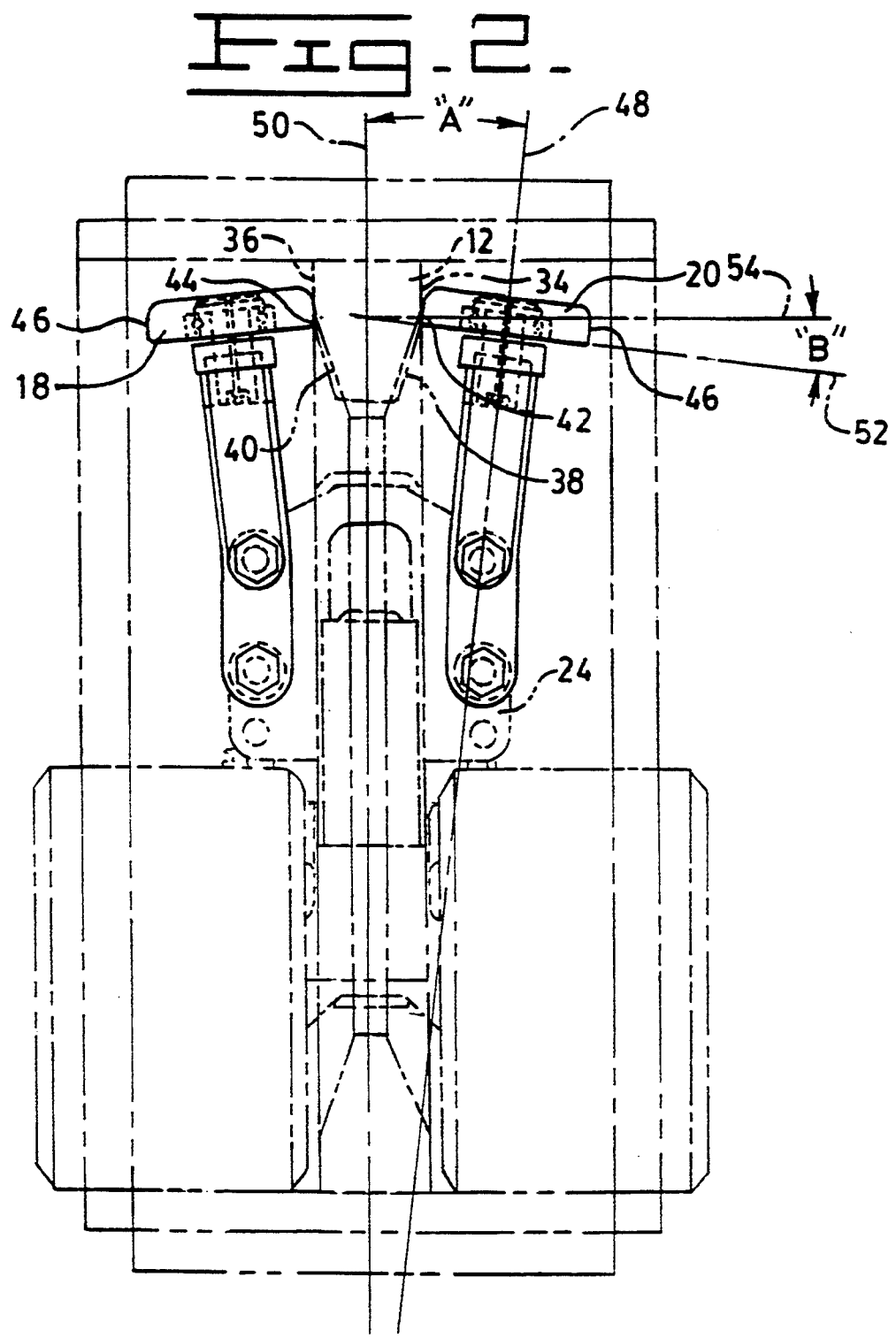

GUIDE ROLLERS FOR FLEXIBLE DRIVE BELT

TECHNICAL FIELD

This invention relates generally to guide rollers and more particularly to guide rollers for a flexible drive belt used on work machines. The flexible drive belt includes a plurality of integrally formed guide blocks and the guide rollers are adapted to contact the guide blocks to guide them between spaced apart idler wheels.

BACKGROUND ART

Agricultural and construction machines are often required to operate in soils which are extremely wet and muddy and in very sandy soils. Conventional wheel type machines cannot operate efficiently in such soil conditions. Therefore, alternate types of machines which can operate in such adverse soil conditions are in demand. One type of such machine is one having an undercarriage incorporating an endless flexible drive belt and associated support rollers and idler wheels. This type of belted undercarriage is now widely used on both powered and non-powered machines. On the non-powered machines, such as pulled work trailers, rubber tires or rubber coated wheels are generally used for the idler wheel assemblies. Each assembly includes a pair of spaced apart tires which form an opening therebetween. The flexible belt includes a plurality of integrally formed resilient guide blocks which pass through the opening to guide the flexible belt. Continuous frictional contact between the guide blocks and the idler wheels can cause damage to the idler wheels and the guide blocks. To prevent such frictional contact and damage, it is important that proper alignment between the guide blocks and the idler tires be maintained. However, even when good alignment is maintained, some contact will occur between the guide blocks and the idler wheels.

The present invention is directed to overcoming one or more of the problems as set forth above.

DISCLOSURE OF THE INVENTION

In one aspect of the present invention, apparatus for guiding a plurality of flexible guide blocks of an elastomeric drive belt of a belted undercarriage assembly includes first and second rotatable guide rollers which are mounted to the undercarriage assembly adjacent first and second spaced idler wheels. The guide rollers are adapted to contact the guide blocks and guide them into an opening formed between the first and second idler wheels.

Idler assemblies for endless belted undercarriage structures often use spaced apart rubber tires or rubber coated wheels as the idler wheels. Most endless drive belts have some type of guide blocks formed on the belt to guide the belt as it moves around the idler wheels. These guide blocks pass through the opening between the idler wheels to guide the flexible belt. If the belt is not closely aligned, the guide blocks will contact the side walls of the idler wheels. This continuous frictional contact can damage the idler wheels and the guide blocks.

The subject invention provides structure which prolongs the useful life of the idler wheels and the flexible guide blocks. This is accomplished by providing structure which guides the guide blocks into the opening between the spaced idler wheels.

BRIEF DESCRIPTION OF THE DRAWINGS

FIG. 2 is a diagrammatic front elevational view taken generally along the lines 2—2 of FIG. 1.

BEST MODE FOR CARRYING OUT THE INVENTION

Figure 1:
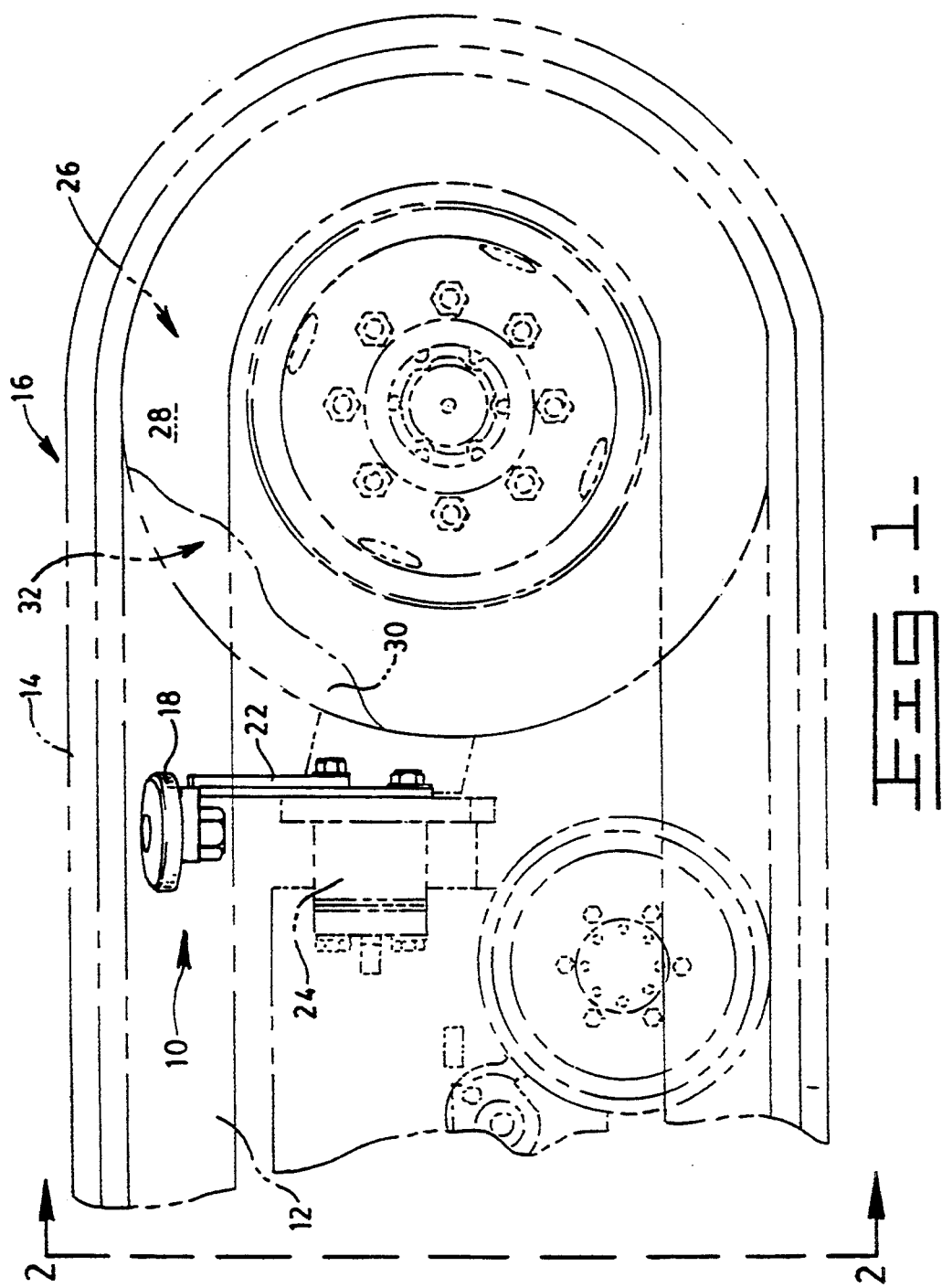
FIG. 1 is a diagrammatic side elevational view of a portion of a belted undercarriage assembly incorporating the subject invention.

Referring to the drawings, an apparatus 10 for guiding a plurality of flexible guide blocks 12 of an elastomeric drive belt 14 of an undercarriage assembly 16 includes first and second spaced apart rotatable guide rollers 18,20, and a bracket structure 22 which is connected to a frame structure 24 of the undercarriage assembly 16. The undercarriage assembly 16 includes an idler assembly 26 having first and second spaced apart idle wheels 28,30. The spaced idler wheels 28,30 form an opening 32 therebetween and the guide blocks 12 are adapted to move through the opening 32. Each of the guide blocks 12 has first and second side surfaces 34,36 and first and second transition portions 38,40 which join respective first and second side surfaces to form first and second angled junctures 42,44. Although the side surfaces 34,36 are shown with the angled junctures 42,44, the side surfaces can be continuously radiused without any defined angled junctures, as shown by the dotted lines.

Each of the guide rollers 18,20 has a circumferential surface 46 and each guide rollers 18,20 is rotatably connected to the bracket structure 22 to establish an axis of rotation 48. The guide rollers 18,20 are positioned adjacent respective first and second side surfaces 34,36 of the guide blocks 12 and also adjacent the idler wheels 28,30 and the opening 32. Although the guide rollers 18,20 are shown substantially the same distance from the idler assembler 26, they can be offset from each other so one is closer to the idler assembly than the other. The circumferential surfaces 46 of the guide rollers 18,20 are adapted to contact the first and second side surfaces 34,36 at or near the angled junctures 42,44. The axis of rotation 48 can be parallel with a plane 50 which passes longitudinally through the center of each guide block 12, but preferably forms an acute angle "A" with the plane 50. The first acute angle "A" can vary in the range of 0.0 to 30.0 degrees, but is preferably in the range of 0.0 to 15.0 degrees.

Each of the guide rollers 18,20 also has a surface of revolution 52 which forms a second acute angle "B" with a plane 54 which is substantially perpendicular to the first and second side surfaces 34,36 of the guide blocks 12. The second acute angle "B" can vary in the range of 0.0 to 30.0 degrees, but is preferably in the range of 0.0 to 15.0 degrees.

Industrial Applicability

With reference to the drawings and the previous detailed description, the subject guide rollers 18,20, are particularly useful for increasing the wear life of certain components of a belted undercarriage assembly 16. Specifically, the guide rollers 18,20 guide the guide blocks 12 of the drive belt 14 into the opening 32 formed between the idler wheels 28,30. This prevents continuous frictional contact between the guide blocks 12 and the side walls of the idler wheels 28,30.

Other aspects, objects, and advantages of this invention can be obtained from a study of the drawings, the disclosure, and the appended claims.

We claim:

1. Apparatus for a belted undercarriage assembly, said assembly including first and second idler wheels which define an opening therebetween, said apparatus comprising:

an elastomeric drive belt including a plurality of flexible guide blocks, each guide block having first and second side surfaces;

first and second spaced apart rotatable guide rollers, each having a circumferential surface, said guide rollers being positioned adjacent respective first and second side surfaces of said guide blocks and adjacent said opening; and a bracket structure connected to said undercarriage assembly, said guide rollers being rotatably connected to said bracket structure with said circumferential surfaces being adapted to contact the respective first and second side surfaces of said guide blocks.

2. An apparatus, as set forth in claim 1, wherein said guide blocks include first and second transition portions which form first and second angled junctures with said respective side surfaces, said guide rollers being adapted to contact said guide blocks adjacent said angled junctures.

3. An apparatus, as set forth in claim 1, wherein each of said guide rollers has an axis of rotation and is mounted on said bracket structure with said axis of rotation forming an acute angle with a plane which passes longitudinally through the center of each guide block.

4. An apparatus, as set forth in claim 3, wherein said acute angle is in the range of 0.1 to 30.0 degrees.

5. An apparatus, as set forth in claim 3, wherein said acute angle is in the range of 0.1 to 15.0 degrees.

6. An apparatus, as set forth in claim 1, wherein said undercarriage assembly includes a frame structure and said guide rollers are rotatably mounted to said frame structure adjacent said idler wheels.

7. An apparatus, as set forth in claim 1, wherein each of said guide rollers has a surface of revolution which forms an acute angle with a plane which is substantially perpendicular to the first and second side surfaces of said guide blocks.

8. An apparatus, as set forth in claim 7, wherein said acute angle is in the range of 0.1 to 30.0 degrees.

9. An apparatus, as set forth in claim 7, wherein said acute angle is in the range of 0.1 to 15.0 degrees.

10. A belted undercarriage assembly having a frame structure, an idler assembly having first and second spaced idler wheels which define an opening therebetween, said assembly comprising:

an elastomeric drive belt having a plurality of flexible guide blocks, said guide blocks having first and second side surfaces and first and second transition portions which form respective first and second transition junctures;

first and second spaced apart rotatable guide rollers positioned adjacent said guide blocks and said idler wheels; and a bracket connected to said frame structure, said guide rollers being rotatably connected to said bracket with said guide rollers being adapted to contact said guide blocks adjacent said transition junctures.

11. An undercarriage assembly, as set forth in claim 10, wherein each of said guide rollers has an axis of rotation and is mounted on said bracket with said axis of rotation forming an acute angle with a plane which passes longitudinally through the center of each guide block.

12. An undercarriage assembly, as set forth in claim 11, wherein said acute angle is in the range of 0.1 to 30.0 degrees.

13. Apparatus for a belted undercarriage assembly, said assembly including first and second idler wheels which define an opening therebetween, said apparatus comprising:

an elastomeric drive belt including a plurality of flexible guide blocks, each guide block having first and second side surfaces;

first and second spaced apart rotatable guide rollers, each having a circumferential surface, said guide rollers being positioned adjacent respective first and second side surfaces of said guide blocks and adjacent said opening;

a bracket structure connected to said undercarriage assembly, said guide rollers being rotatably connected to said bracket structure with said circumferential surfaces being adapted to contact the respective first and second side surfaces of said guide blocks; and each of said guide rollers having an axis of rotation and being mounted on said bracket structure with said axis of rotation forming an acute angle with a plane which passes longitudinally through the center of each guide block.

14. A belted undercarriage assembly having a frame structure, an idle assembly having first and second spaced idler wheels which define an opening therebetween, said assembly comprising:

an elastomeric drive belt having a plurality of flexible guide blocks, said guide blocks having first and second side surfaces and first and second transition portions which form respective first and second transition junctures;

first and second spaced apart rotatable guide rollers positioned adjacent said guide blocks and said idler wheels;

a bracket connected to said frame structure, said guide rollers being rotatably connected to said bracket with said guide rollers being adapted to contact said guide blocks adjacent said transition junctures; and each of said guide rollers having an axis of rotation and being mounted on said bracket with said axis of rotation forming an acute angle with a plane which passes longitudinally through the center of each guide block.

* * * * *